(12) United States Patent
Sakiyama et al.

(10) Patent No.: US 10,017,013 B2
(45) Date of Patent: Jul. 10, 2018

(54) AIRCRAFT TIRE INCLUDING TREAD WITH GROOVE RECESSES FOR SUPPRESSING HEAT GENERATION

(71) Applicant: BRIDGESTONE CORPORATION, Chuo-ku, Tokyo (JP)

(72) Inventors: Tomotaka Sakiyama, Tokyo (JP); Yohei Okita, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 5 days.

(21) Appl. No.: 14/786,163

(22) PCT Filed: Apr. 15, 2014

(86) PCT No.: PCT/JP2014/060753
§ 371 (c)(1),
(2) Date: Oct. 22, 2015

(87) PCT Pub. No.: WO2014/175125
PCT Pub. Date: Oct. 30, 2014

(65) Prior Publication Data
US 2016/0152093 A1   Jun. 2, 2016

(30) Foreign Application Priority Data

Apr. 25, 2013 (JP) .................... 2013-092584
Apr. 25, 2013 (JP) .................... 2013-092887

(51) Int. Cl.
*B60C 11/13* (2006.01)
*B60C 11/03* (2006.01)
*B60C 11/04* (2006.01)

(52) U.S. Cl.
CPC ...... *B60C 11/0323* (2013.01); *B60C 11/0327* (2013.01); *B60C 11/04* (2013.01);
(Continued)

(58) Field of Classification Search
CPC . B64C 25/36; B60C 2200/00; B60C 2200/02; B60C 23/18; B60C 99/00;
(Continued)

(56) References Cited

U.S. PATENT DOCUMENTS 3,494,401 A * 2/1970 Bush .................. B60C 11/0306
152/209.18
2002/0092591 A1 * 7/2002 Cortes ................ B60C 11/0309
152/209.18
(Continued)

FOREIGN PATENT DOCUMENTS

CN      101811420 A    8/2010
EP      2570270 A1     3/2013
(Continued)

OTHER PUBLICATIONS

Kiwaki (JP 2011-245913, machine translation).*
(Continued)

*Primary Examiner* — Robert C Dye
*Assistant Examiner* — Sedef Esra Ayalp Paquette
(74) *Attorney, Agent, or Firm* — SOLARIS Intellectual Property Group, PLLC

(57) ABSTRACT

In order to suppress an excessive increase in the temperature of a tread section, a tire includes: a first land portion that is formed to a tread section by providing plural circumferential direction grooves extending around a tire circumferential direction at a spacing in a tire width direction, and that includes plural first recesses provided around the tire circumferential direction of a wall face of the first land portion; and a second land portion that has a wider width than the first land portion, and that includes a greater number of second recesses than the number of the first recesses provided around the tire circumferential direction of a wall face of the second land portion.

4 Claims, 11 Drawing Sheets

(52) U.S. Cl.
CPC ... *B60C 11/1307* (2013.01); *B60C 2011/0334* (2013.01); *B60C 2011/0341* (2013.01); *B60C 2011/0381* (2013.01); *B60C 2011/133* (2013.01); *B60C 2200/02* (2013.01)

(58) Field of Classification Search
CPC ....... B60C 99/003; B60C 11/00; B60C 11/03; B60C 11/0304; B60C 11/0327; B60C 11/1307; B60C 2011/133; B60C 11/04; B60C 11/12; B60C 11/13; B60C 2011/0337; B60C 2011/0353; B60C 2011/0358; B60C 2011/0365; B60C 2011/0372; B60C 2011/0374; B60C 2011/0376; B60C 2011/0381; B60C 11/042; B60C 11/1281; B60C 11/1315; B60C 11/0323
USPC .............................. 152/209.18, 209.23, 209.3
See application file for complete search history.

(56) References Cited

U.S. PATENT DOCUMENTS

| | | | | |
|---|---|---|---|---|
| 2006/0042738 | A1* | 3/2006 | Matsumoto | B60C 11/13 152/209.21 |
| 2007/0137744 | A1 | 6/2007 | Ueyoko et al. | |
| 2008/0121325 | A1* | 5/2008 | Durand | B60C 11/0309 152/209.18 |
| 2013/0276949 | A1 | 10/2013 | Yano | |
| 2014/0367013 | A1* | 12/2014 | Chambriard | B60C 11/04 152/209.18 |

FOREIGN PATENT DOCUMENTS

| | | | | |
|---|---|---|---|---|
| GB | 727207 | A * | 3/1955 | ......... B60C 11/0309 |
| JP | 3184767 | B2 * | 7/2001 | ......... B60C 11/0323 |
| JP | 2007-168784 | A | 7/2007 | |
| JP | 2010-013099 | A | 1/2010 | |
| JP | 2011245913 | A * | 12/2011 | |
| JP | 2012-153310 | A | 8/2012 | |
| KR | 20120023565 | A | 3/2012 | |
| WO | 2013/092581 | A1 | 6/2013 | |

OTHER PUBLICATIONS

John Robertson Dunlap, Giant Tires for Handley-Page Airplanes, Jun. 1, 1919, The India Rubber World, vols. 59-60, p. 480-481.*
Toshiyuki Ohashi, JP-3184767-B2, machine translation. (Year: 2001).*
European Search Report dated Feb. 16, 2016, issued in corresponding EP Patent Application.

* cited by examiner

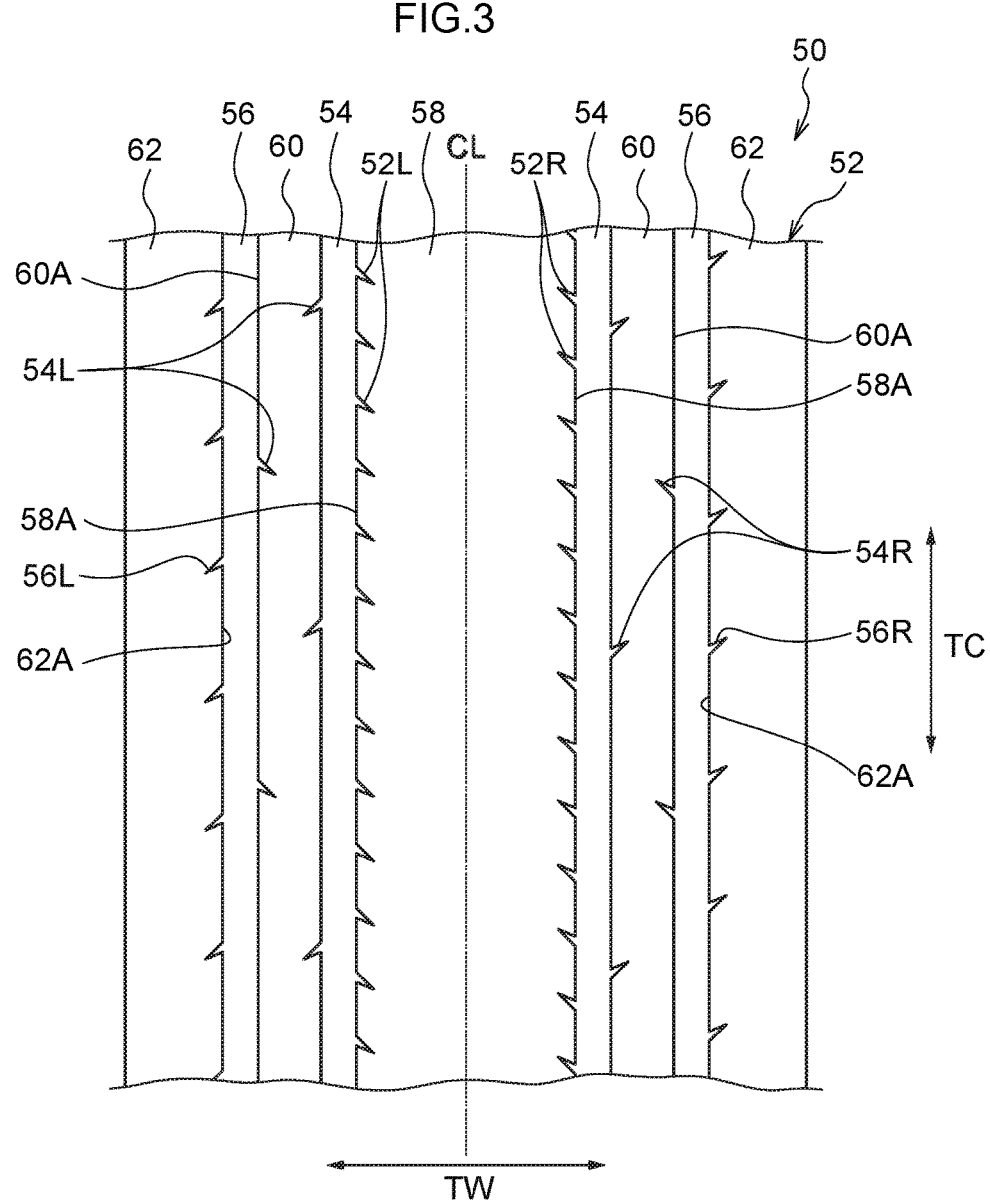

AIRCRAFT TIRE INCLUDING TREAD WITH GROOVE RECESSES FOR SUPPRESSING HEAT GENERATION

TECHNICAL FIELD

The present invention relates to an aircraft tire, principally for use in passenger aircraft.

BACKGROUND ART

Japanese Patent Application Laid-Open (JP-A) No. 2012-153310 describes an aircraft tire including, between tread rubber and a carcass, a belt layer extending around the tire circumferential direction, a belt reinforcement layer at an angle with respect to the tire circumferential direction, and a protection belt layer extending in a wave pattern around the tire circumferential direction at the peripheral outside of the belt reinforcement layer. JP-A No. 2007-168784 describes an aircraft tire in which a tread section is formed with plural circumferential direction grooves extending around the tire circumferential direction.

SUMMARY OF INVENTION

Technical Problem

However, since aircraft tires experience heavy loads in use, sometimes the edges of land portions that contact the pavement during take-off and landing are squashed out, shear distortion occurs due to the deformation of the land portions, and the edges of the land portions generate heat.

In consideration of the above circumstances, an object of the present invention is to provide an aircraft tire capable of suppressing heat generation in land portions.

Solution to Problem

An aircraft tire according to a first aspect includes a land portion that is provided to a tread section and that is demarcated by plural circumferential direction grooves extending around a tire circumferential direction, and wall faces of the land portion. The wall faces of the land portion are formed with plural recesses at a spacing around the tire circumferential direction, and the recesses formed to one of the wall faces and the recesses formed at another of the wall faces are formed at different positions to each other around the tire circumferential direction.

An aircraft tire according to a second aspect includes a first land portion that is formed at a tread section by providing plural circumferential direction grooves extending around a tire circumferential direction at an interval in a tire width direction, and that includes plural first recesses provided in the tire circumferential direction of a wall face of the first land portion; and a second land portion that is formed by the circumferential direction grooves provided at the tread section, that has a wider width than the first land portion, and that includes a greater number of second recesses than a number of the first recesses, the second recesses being provided in the tire circumferential direction of a wall face of the second land portion.

Advantageous Effects of Invention

Due to the above configuration, the aircraft tire is capable of suppressing heat generation in the land portions.

BRIEF DESCRIPTION OF DRAWINGS

FIG. 3 is an opened-out view illustrating a tread pattern of an aircraft tire according to a second exemplary embodiment.

DESCRIPTION OF EMBODIMENTS

First Exemplary Embodiment

Figure 1:
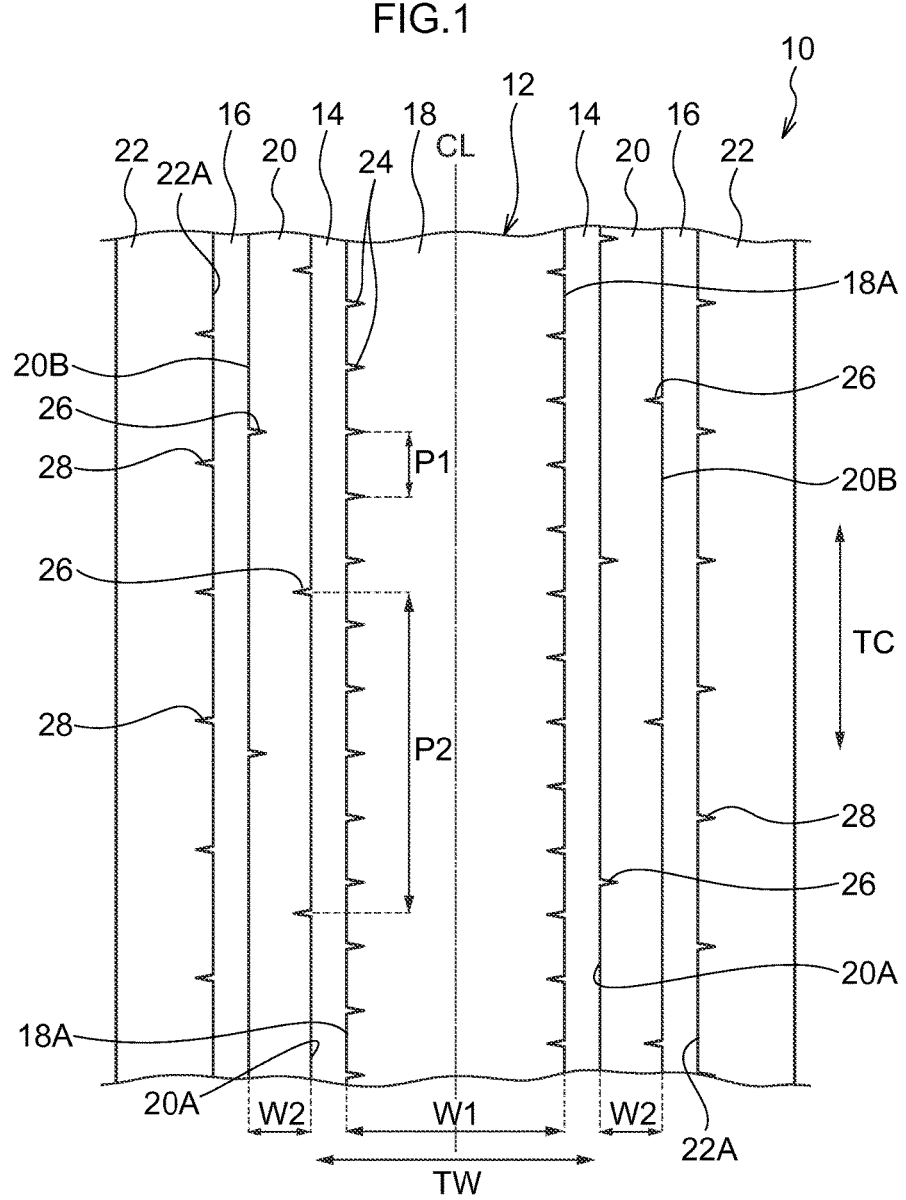
FIG. 1 is an opened-out view illustrating a tread pattern of an aircraft tire according to a first exemplary embodiment.

Explanation follows regarding an aircraft tire 10 (referred to below as the tire 10) according to a first exemplary embodiment of the present invention, with reference to the drawings. The arrow TW in the drawings indicates a direction parallel to the axis of rotation of the tire 10 (referred to below simply as the "tire width direction"). The arrow TC in the drawings indicates the circumferential direction of a circle centered on the axis of rotation of the tire 10 (referred to below as simply the "tire circumferential direction"). CL in the drawings indicates an equatorial plane (a plane passing the width direction center of the tire and parallel to the tire radial direction). The tire radial direction is a direction orthogonal to the axis of rotation of the tire 10.

The tire 10 illustrated in FIG. 1 is a tire employed in an aircraft such as a passenger aircraft, and includes a tread section 12 formed by a tread rubber layer. An internal structure at the inside of the tread section 12 is a known internal structure for an aircraft tire, and is configured by a cut protector layer, a belt protection layer, a spiral belt layer, and a carcass layer in sequence from the tread section 12 side toward the tired radial direction inside.

The tread section 12 is formed with plural circumferential direction grooves extending around the tire circumferential direction. Specifically, a pair of first circumferential direction grooves 14 are formed on either side of the equatorial plane CL, and a pair of second circumferential direction grooves 16 are formed further to the tire radial direction outside than the first circumferential direction grooves 14, to give a total of four circumferential direction grooves. The first circumferential direction grooves 14 and the second circumferential direction grooves 16 are formed with the same groove width and the same groove depth as each other, and the tread section 12 is configured with line symmetry about the equatorial plane CL.

Note that as an example, in the present exemplary embodiment, the two first circumferential direction grooves 14 and the two second circumferential direction grooves 16 configuring the total of four circumferential direction grooves are formed at spacings in the tire width direction; however there is no limitation thereto. For example, a pair of left and right third circumferential direction grooves may be formed further to the tire width direction outside than the second circumferential direction grooves 16. Conversely, the number of tire circumferential direction grooves may be reduced, with only the pair of first circumferential direction grooves 14 formed. Moreover, a circumferential direction main groove may be formed extending around the tire circumferential direction along the equatorial plane CL. Still further, the grooves may be asymmetrical about the equatorial plane CL. Moreover, the first circumferential direction grooves 14 and the second circumferential direction grooves 16 may be formed with different groove widths to each other, or different groove depths to each other.

The tread section 12 includes a second land portion 18 positioned at a tire width direction central portion demarcated by the pair of first circumferential direction grooves 14, and first land portions 20 further to the tire width direction outside than the second land portion 18, demarcated by the first circumferential direction grooves 14 and the second circumferential direction grooves 16. Shoulder portions 22 are provided at the tire width direction outside of the second circumferential direction grooves 16.

Second notches 24, serving as second recesses, are formed in both tire width direction wall faces 18A of the second land portion 18. Plural second notches 24 are formed at spacings around the tire circumferential direction, and as an example in the present exemplary embodiment, 24 of the second notches 24 are formed at uniform spacings around the tire circumferential direction. Only a portion of the second land portion 18 is illustrated in FIG. 1, and so thirteen of the second notches 24 are illustrated on both edge portions of the second land portion 18. The second notches 24 may also be formed at non-uniform spacings. Note that the second notches 24 are formed at different positions to each other in the tire circumferential direction, and in the present exemplary embodiment, the second notches 24 formed to one of the wall faces 18A and the second notches 24 formed in the other of the wall faces 18A are formed offset to each other around the tire circumferential direction.

Figure 2:
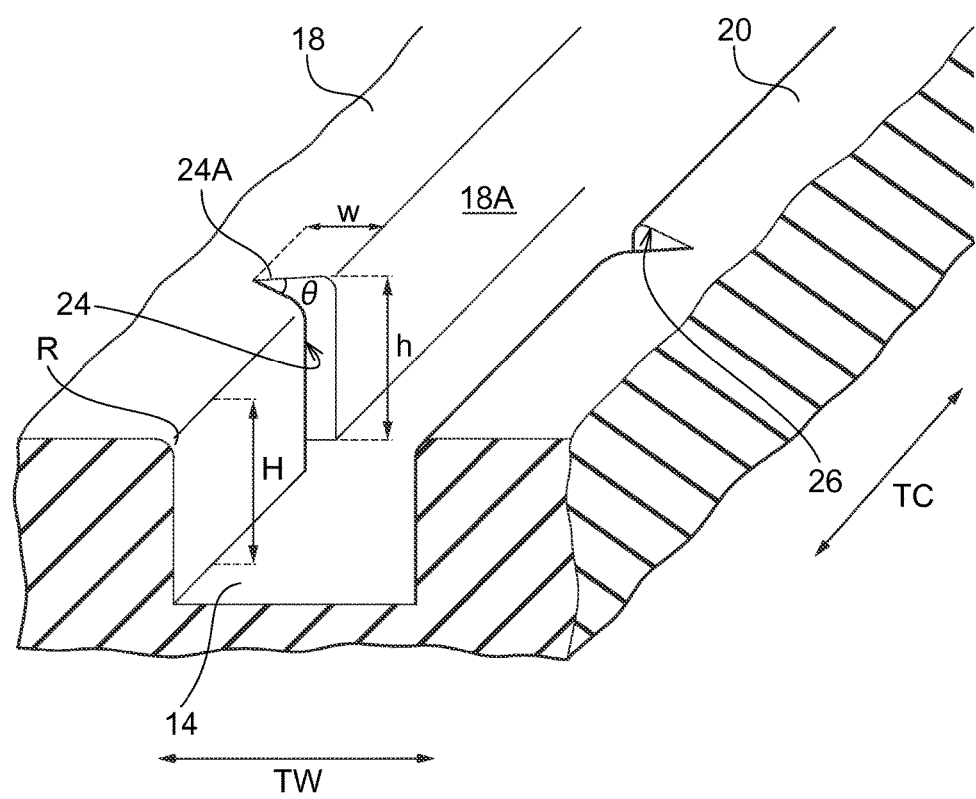
FIG. 2 is an enlarged perspective view illustrating relevant portions of a recess according to the first exemplary embodiment.

As illustrated in FIG. 2, the second notches 24 are formed by notching the wall faces 18A of the second land portion 18 along the tire width direction. The second notches 24 are formed from the groove bottoms of the first circumferential direction grooves 14 to the front face (tread face) of the second land portion 18 in the tire radial direction, and open onto the front face (tread face) of the second land portion 18. In the present exemplary embodiment, the openings 24A of the second notches 24 are configured in substantially triangular shapes in plan view, narrowing in width on progression from the edge portions toward a central portion of the second land portion 18. However, there is no limitation thereto, and configuration may be made with other shapes. For example, the openings 24A may be formed in semicircular shapes or elliptical shapes.

As illustrated in FIG. 1, first notches 26, serving as first recesses, are formed in both tire width direction edge portions of the respective first land portions 20, at spacings around the tire circumferential direction. The first notches 26 are formed with the same shape as the second notches 24 formed to the second land portion 18, and as an example in the present exemplary embodiment, eight of the first notches 26 are formed at uniform spacings around the tire circumferential direction. Since only a portion of the first land portions 20 is illustrated in FIG. 1, two or three of the first notches 26 are illustrated on each edge portion of the respective first land portions 20.

Note that the first notches 26 are formed at different positions to each other around the tire circumferential direction. Here, "different positions to each other around the tire circumferential direction" means positions where that the first notches 26 do not overlap with each other when the first notches 26 formed to the first land portions 20 are projected in the tire width direction. Accordingly, the second notches 24 formed to the second land portion 18 and the first notches 26 formed to the first land portions 20 may be formed at the same positions as each other around the tire circumferential direction. Moreover, the second notches 24 formed to the second land portion 18 and third notches 28 formed to the shoulder portions 22 may be formed at the same positions as each other around the tire circumferential direction.

The third notches 28 are formed to side faces 22A on the second circumferential direction groove 16 side of the respective shoulder portions 22. The shape of the third notches 28 is the same as the shape of the second notches 24 of the second land portion 18 and the first notches 26 of the first land portions 20. As an example in the present exemplary embodiment, 12 of the third notches 28 are formed at uniform spacings around the tire circumferential direction. Since only a portion of each shoulder portion 22 is illustrated in FIG. 1, six of the third notches 28 are respectively illustrated.

Operation

Next, explanation follows regarding operation of the tire 10 of the present exemplary embodiment. In the tire 10 of the present exemplary embodiment, the second notches 24 are formed to the wall faces 18A of the second land portion 18, and the first notches 26 are formed to a wall face 20A on the first circumferential direction groove 14 side of each of the first land portions 20 and to a wall face 20B on the second circumferential direction groove 16 side of each of the first land portions 20. The third notches 28 are formed to a wall face 22A on the second circumferential direction groove 16 side of each of the shoulder portions 22. Accordingly, the second notches 24, the first notches 26, and the third notches 28 increase the surface area of the second land portion 18, the first land portions 20, and the shoulder portions 22 respectively. The contact surface area with air is accordingly increased, enabling a greater cooling effect of the tire 10.

Moreover, tension acting on the second land portion 18, the first land portions 20, and the shoulder portions 22 is alleviated by the second notches 24, the first notches 26, and the third notches 28. Namely, tire circumferential direction deformation of both edge portions of the second land portion 18 is made easier than in a state in which the second notches 24 are not formed. This thereby enables shear distortion acting on the edge portions of the second land portion 18 to be reduced, and heat generation to be suppressed. Similar also applies to the first land portions 20 and the shoulder portions 22. Alleviating tension reduces the amount of wear in the tire 10, enabling an increase in durability.

The second notches 24 formed at both edge portions of the second land portion 18 are formed at different positions to each other around the tire circumferential direction, thereby enabling temperature variation around the circumferential direction of the tire 10 to be suppressed. Namely, in cases in which the second notches 24 are formed at the same tire circumferential direction positions as each other on both edge portions of the second land portion 18, the tire 10 only undergoes cooling at portions formed with the second notches 24, and temperature variation sometimes arises around the tire circumferential direction. Accordingly, forming the second notches 24 offset with respect to each other around the tire circumferential direction as in the tire 10 of the present exemplary embodiment enables the occurrence of temperature variation around the tire circumferential direction to be suppressed.

Note that in the present exemplary embodiment, the second notches 24 are formed from the groove bottoms of the first circumferential direction grooves 14 to the front face (tread face) of the second land portion 18; however there is no limitation thereto, and the second notches 24 may be formed by notching only the vicinity of the groove bottoms of the first circumferential direction grooves 14, without opening onto the second land portion 18. However, opening the second notches 24 onto the front face (tread face) of the second land portion 18 enables a greater reduction in shear distortion due to splitting up the tread in the tire circumferential direction at both edge portions of the second land portion 18. The advantageous effect of splitting up the second land portion 18 in the tire circumferential direction can be further enhanced by forming the tire radial direction notch depth h of the second notches 24 with respect to the groove depth H of the first circumferential direction groove 14 in the range $0.5H \leq h \leq H$. Similar also applies to the first notches 26 and the third notches 28. Note that in the present exemplary embodiment, h=H, as illustrated in FIG. 2.

In the present exemplary embodiment, the tire width direction notch width w of the second notches 24 is formed as a width of $0.5R \leq w \leq 1.5R$, where R is the radius of curvature of the tire width direction edge portion of the second land portion 18. In plan view, an apex angle θ of the second notch 24 is formed at an angle of $0° < θ \leq 90°$. Setting the width w and the apex angle θ of the second notches 24 in the ranges described above enables the rigidity of the second land portion 18 to be maintained, while increasing the surface area of the second land portion 18; however, the second notches 24 may be formed with dimensions outside the above ranges. Similar also applies to the first notches 26 and the third notches 28.

In the present exemplary embodiment, a tire circumferential direction pitch P1 of the second notches 24 formed to the wall faces 18A of the second land portion 18 is set as a narrower pitch than a tire circumferential direction pitch P2 of the first notches 26 formed to the wall faces 20A and 20B of the first land portions 20 (see FIG. 1). Since a tire width direction length W1 of the second land portion 18 is longer than a tire width direction length W2 of the respective first land portions 20, the second land portion 18 is more is more prone to build-up of, and less able to dissipate, heat inside the tire than the first land portions 20. Accordingly, setting the pitch P1 of the second notches 24 narrower than the pitch P2 of the first notches 26 increases the cooling effect in the second land portion 18, enabling temperature variation between the second land portion 18 and the first land portions 20 to be reduced. Namely, temperature variation in the tire width direction can be reduced in the tire 10.

Test Examples

In order to confirm the advantageous effects of the tire 10 according to the present exemplary embodiment, three types of Example tires, and a Comparative Example tire, giving a total of four tires, were prepared and tested. Explanation follows regarding the Example tires and the Comparative Example tires employed in testing. Note that each of the tires employed in testing employed a tire size of 1400×530R23 40PR, and employed internal pressure of standard internal pressure (1500 kPa). Moreover, first circumferential direction grooves and second circumferential direction grooves were formed in each tire at the same positions as in the tire 10 of the first exemplary embodiment, and notches of the same shape as the second notches 24 were formed in the second land portion.

Example 1: Each edge portion of second land portion formed with 8 notches

Example 2: Each edge portion of second land portion formed with 12 notches

Example 3: Each edge portion of second land portion formed with 24 notches

Comparative Example: Conventional tire not formed with notches

Testing Details: Take-off testing was performed under conditions set out in TSO-C62e, and the temperature of edge portions of the land portion was measured. The measured temperature was evaluated as an index. For wear amount, the tire was spun at 2 m/min, and the shear force and the integral value of slip amount at the edge portions of the land portion during spinning was computed as wear energy, and this was evaluated as a wear index.

TABLE 1

|  | Comparative Example 1 | Example 1 | Example 2 | Example 3 |
| --- | --- | --- | --- | --- |
| Number of notches | 0 | 8 each | 12 each | 24 each |
| Land portion edge portion temperature | 100 | 95 | 92 | 89 |
| Land portion edge portion wear amount | 100 | 101 | 102 | 103 |

As illustrated by the test results in Table 1, a cooling effect could be confirmed in the tires of Examples 1 to 3 that were formed with notches in comparison to the Comparative Example that was not formed with notches. Moreover, it could be confirmed that the cooling effect of the tire increased the greater the number of notches. However, since a sufficient cooling effect can be obtained if there are 24 notches on both edge portions of the land portion, there is no need to increase the number of notches any further. The wear amount of the land portion edge portion decreased the greater the number of notches.

Second Exemplary Embodiment

Next, explanation follows regarding an aircraft tire 50 (referred to below as the tire 50) according to a second exemplary embodiment of the present invention. Note that configurations similar to those of the first exemplary embodiment are allocated the same reference numerals, and explanation thereof is omitted. As illustrated in FIG. 3, the tire 50 of the present exemplary embodiment includes a tread section 52, and the tread section 52 is formed with first circumferential direction grooves 54 and second circumferential direction grooves 56 at similar positions to in the first exemplary embodiment.

The wall faces 58A of the second land portion 58 demarcated by the first circumferential direction grooves 54 are formed with notches 52L, 52R. The notches 52L and the notches 52R are formed offset with respect to each other at spacings around the tire circumferential direction, and as an example in the present exemplary embodiment, 24 of the notches 52L and the notches 52R respectively are formed at uniform spacings around the tire circumferential direction.

Note that the notches 52L, 52R are formed by notching the wall faces 58A of the second land portion 58 obliquely with respect to the tire width direction. As an example, in the present exemplary embodiment, the notches 52L and the notches 52R are formed at opposite angles to each other with respect to the tire width direction. Namely, the notches 52L extend obliquely toward the lower side of the drawing on progression from the wall face 58A toward the tire width direction inside, and the notches 52R extend obliquely toward the upper side of the drawing on progression from the wall face 58A toward the tire width direction inside.

The wall faces 60A on both tire width direction edge portions of the respective first land portions 60 are formed with notches 54L and 54R. The notches 54L on the left side of the equatorial plane CL in the drawing extend obliquely toward the lower side of the drawing on progression from the wall faces 60A toward the center of the first land portion 60. The notches 54R on the right side of the equatorial plane CL in the drawing extend obliquely toward the upper side of the drawing on progression from the wall faces 60A toward the center of the first land portion 60.

Notches 56L, 56R are formed to the wall faces 62A on the second circumferential direction groove 56 side of the respective shoulder portions 62. The notches 56L on the left side of the equatorial plane CL in the drawing extend obliquely toward the lower side of the drawing on progression from the wall face 62A toward the tire width direction outside. The notches 56R on the right side of the equatorial plane CL in the drawing extend obliquely toward the upper side of the drawing on progression from the wall face 62A toward the tire width direction outside. Note that in the present exemplary embodiment, the notches 52L, 52R, 54L, 54R, 56L, and 56R are all formed with the same shape as each other; however there is no limitation thereto, and they may be formed with different respective shapes. The notches 52L, 54L, and 56L are formed at the same oblique angle with respect to the tire width direction; however they may be formed at different oblique angles to each other. For example, the oblique angles may be set according to the tire circumferential direction stress acting on the respective land portions when in contact with the pavement. Similar also applies to the notches 52R, 54R, and 56R.

Figure 4A:
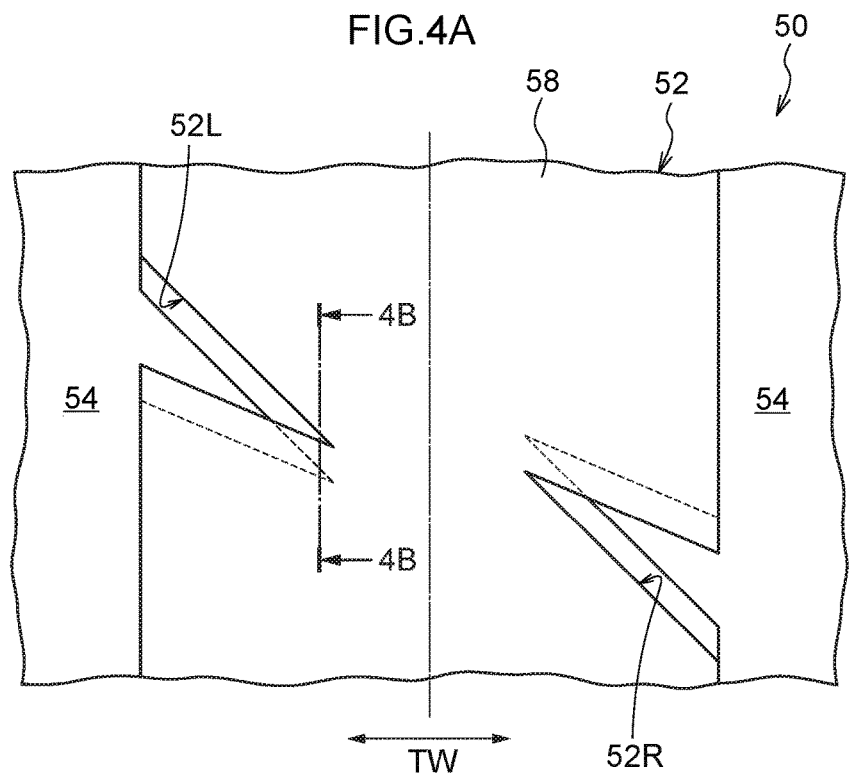
FIG. 4A is an enlarged perspective view illustrating relevant portions of a recess according to the second exemplary embodiment.
Figure 4B:
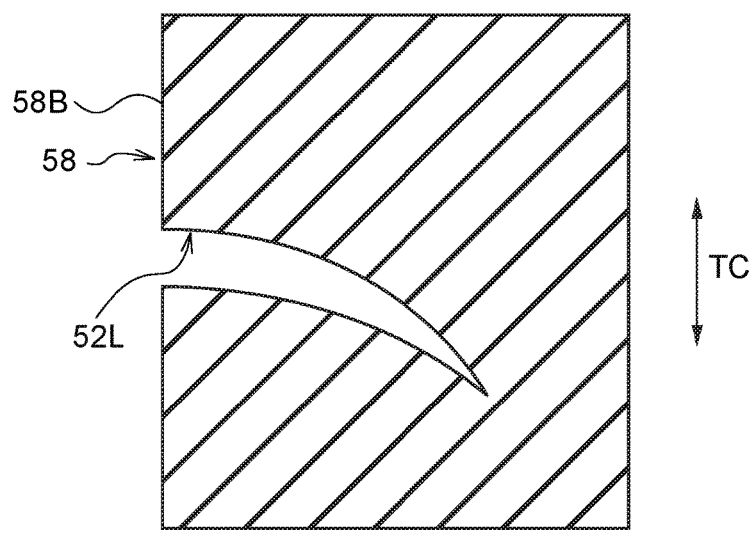
FIG. 4B is a cross-section taken along line 4B-4B in FIG. 4A.

As illustrated in FIG. 4, the notches 52L are formed obliquely with respect to the depth direction of the second land portion 58 (tire radial direction). Specifically, as illustrated in FIG. 4B, they extend obliquely toward the lower side of the drawing (tire circumferential direction side) on progression from the front face (tread face) 58B of the of the second land portion 58 toward the tire radial direction inside. The notches 52R extend obliquely toward the opposite side to the notches 52L (the upper side of the drawing) on progression toward the tire radial direction from the front face (tread face) 58B of the second land portion 58.

In the tire 50 according to the present exemplary embodiment, the second land portion 58 deforms toward the tire circumferential direction side when the second land portion 18 contacts the pavement and both edge portions of the second land portion 58 are pushed out, thereby enabling the occurrence of shear distortion to be suppressed. Note that, for example, when the tire 50 rotates toward the upper side of the drawing in FIG. 3, the second land portion 58, the first land portion 60, and the shoulder portion 62 on the right side of the equatorial plane CL in the drawings more readily deform toward the tire circumferential direction side. When the tire 50 rotates in the opposite direction, the second land portion 58, the first land portion 60, and the shoulder portion 62 on the left side of the equatorial plane CL in the drawings more readily deform toward the tire circumferential direction side. The notches may accordingly be formed in opposite directions to each other with respect to the tire width direction.

In the present exemplary embodiment, on either side of the equatorial plane CL, the oblique directions of the notches 52L, 54L, 56L on the left side in the drawing, and of the notches 52R, 54R, 56R on the right side in the drawing, are opposite directions to each other; however there is no limitation thereto. For example, it may be the oblique directions of the notches 54L, 54R on both edge portions of each first land portion 60 that are formed in opposite directions to each other. Moreover, all of the notches may be formed in the same direction. In such cases, the land portions can be made to deform readily in only one direction, by specifying the rotation direction of the tire.

In the present exemplary embodiment, the notches 52L extend obliquely with respect to the tire width direction, and also extend obliquely with respect to the tire radial direction; however there is no limitation thereto. For example, they may be formed obliquely with respect to the tire width direction and in a straight line along the tire radial direction, or conversely, they may be formed in a straight line along the tire width direction and obliquely with respect to the tire radial direction. Furthermore, the oblique directions with respect to the tire width direction and the oblique directions with respect to the tire radial direction may be different directions to each other.

Third Exemplary Embodiment

Figure 5:
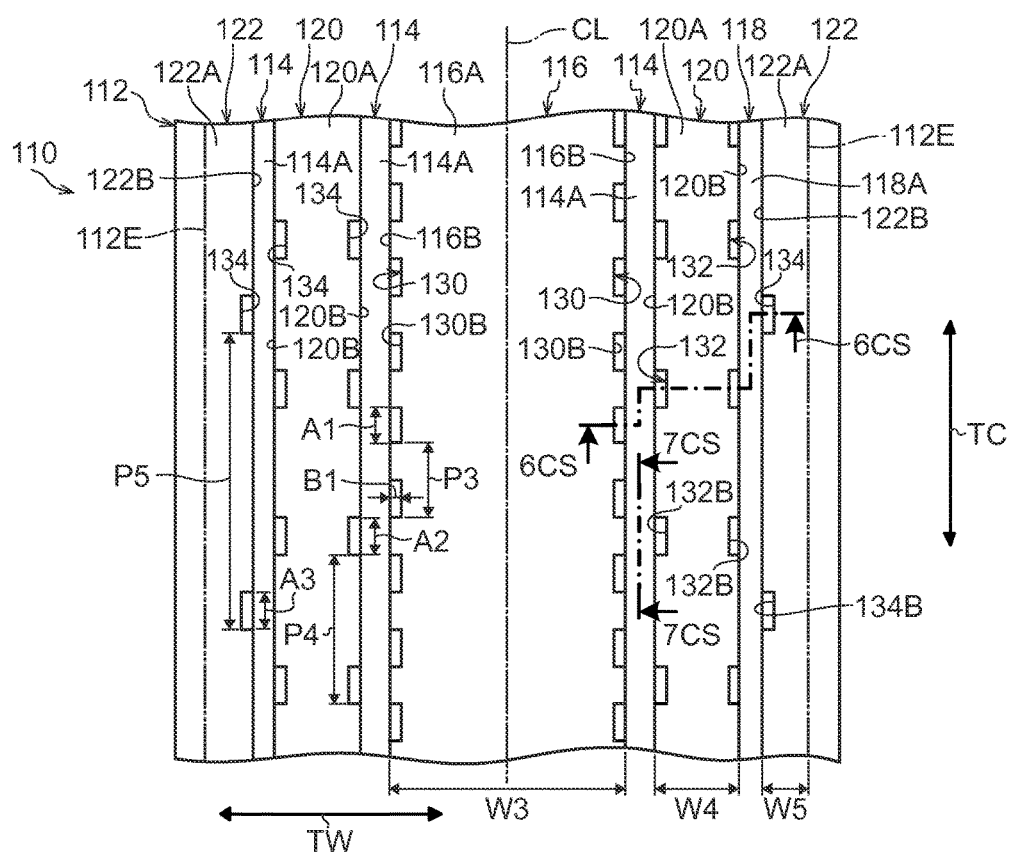
FIG. 5 is an opened-out view illustrating a tread pattern of an aircraft tire according to a third exemplary embodiment.
Figure 6:
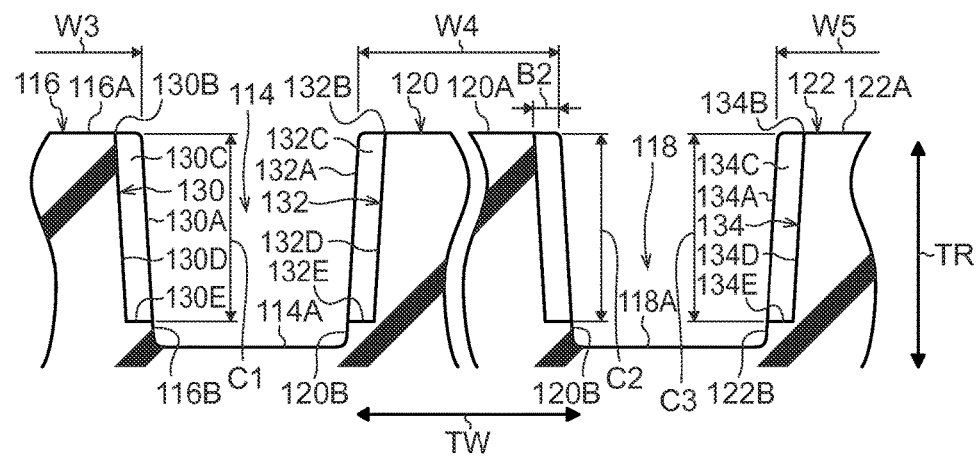
FIG. 6 is a cross-section taken along line 6CS-6CS in FIG. 5.
Figure 7:
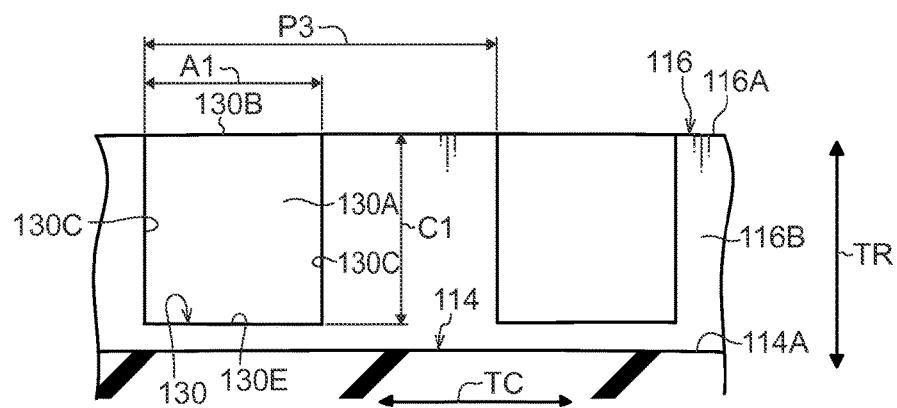
FIG. 7 is a cross-section taken along line 7CS-7CS in FIG. 5.

Next, explanation follows regarding an aircraft tire of a third exemplary embodiment of the present invention. FIG. 5 is an opened-out view illustrating a tread section 112 of an aircraft tire (referred to below as simply "tire") 110 of the third exemplary embodiment. The arrow TR in FIG. 6 and FIG. 7 illustrates the radial direction of the tire 110 (referred to below as the "tire radial direction" as appropriate). In the present exemplary embodiment, the side closer to the tire equatorial plane CL along the tire axial direction (tire width direction) is referred to as the "tire axial direction inside", and the sides further from the tire equatorial plane CL along the tire axial direction (tire width direction) is referred to as the "tire axial direction outside".

In FIG. 5, 112E indicates the ground contact edges of the tread section 112. Here, "ground contact edges" refers to the outermost ground contact points in the tire axial direction when the tire is fitted to a standard rim (reference rim) according to the standards set out in The Tire and Rim Association Inc. (TRA) Year Book or The European Tyre and Rim Technical Organisation (ETRTO) Year Book, the tire is inflated to an internal pressure of the air pressure (standard internal pressure) corresponding to the maximum load (standard load) on a single wheel of the applicable size set out in the same standard, and applied with the standard load for a single wheel of the applicable size set out in the same standard.

The internal structure of the tire 110 may employ an internal structure similar to that of a known aircraft tire. Explanation regarding the internal structure of the tire 110 is accordingly omitted.

As illustrated in FIG. 5, the tread section 112 configuring the ground contact location between the tire 110 and the pavement is provided with respective circumferential direction grooves 114 extending around the tire circumferential direction on either side of the tire equatorial plane CL. A rib shaped center land portion 116 extending continuously around the tire circumferential direction is formed between the pair of circumferential direction grooves 114. Note that the center land portion 116 is formed over the tire equatorial plane CL of the tread section 112.

The tread section 112 is further provided with circumferential direction grooves 118 extending around the tire circumferential direction at the tire axial direction outside of the circumferential direction grooves 114. Rib shaped intermediate land portions 120 extending continuously around the tire circumferential direction are formed between the circumferential direction grooves 114 and the circumferential direction grooves 118. The tread section 112 is further formed with rib shaped shoulder land portions 122 extending continuously around the tire circumferential direction at the tire axial direction outside of the circumferential direction grooves 118.

As illustrated in FIG. 5, the width (ground contact face width) W3 of the center land portion 116 is wider than a width W4 of the respective intermediate land portions 120 and a width W5 of the respective shoulder land portions 122. As viewed in cross-section taken along the tire axial direction, the width W3 of the center land portion 116 is the average value around the entire tire circumference of the length, measured along the tire axial direction, between intersection points between an extension line of a front face (tread face) 116A of the center land portion 116 and respective extension lines of both wall faces 116B of the center land portion 116 (synonymous with groove walls on the center land portion 116 side of the circumferential direction grooves 114).

As viewed in cross-section taken along the tire axial direction, the width W4 of the intermediate land portion 120 is the average value around the entire tire circumference, measured along the tire axial direction, between an intersection point between an extension line of a front face (tread face) 120A of the intermediate land portion 120 and an extension line of a wall face (synonymous with a groove wall on the intermediate land portion 120 side of the circumferential direction groove 114) 120B on the tire equatorial plane CL side of the intermediate land portion 120, and an intersection point between the extension line of the front face (tread face) 120A of the intermediate land portion 120 and an extension line of a wall face (synonymous with a groove wall on the intermediate land portion 120 side of the circumferential direction grooves 118) 120B on the ground contact edge 112E side of the intermediate land portion 120.

As viewed in cross-section taken along the tire axial direction, the width W5 of the shoulder land portion 122 is the average value around the entire tire circumference, measured along the tire axial direction, between an intersection point between an extension line of a front face (tread face) 122A of the shoulder land portion 122 and an extension line of a wall face (synonymous with a groove wall on the shoulder land portion 122 side of the circumferential direction groove 118) 122B, and the ground contact edge 112E. Note that the center land portion 116 of the present exemplary embodiment is an example of a second land portion of the present invention, and the intermediate land portions 120 are an example of first land portions of the present invention.

As illustrated in FIG. 5 to FIG. 7, plural recesses 130 are provided to both wall faces (side walls) 116B of the center land portion 116 around the tire circumferential direction. Specifically, the plural recesses 130 are provided to the wall faces 116B at spacings around the tire circumferential direction.

As illustrated in FIG. 5, in the present exemplary embodiment, the recesses 130 are provided to the wall faces 116B at uniform spacings P3 around the tire circumferential direction. The recesses 130 provided to both wall faces 116B are disposed at the same positions as each other around the tire circumferential direction. In other words, in the present exemplary embodiment, the recesses 130 provided to both wall faces 116B are aligned in rows along the tire axial direction. Note that the present invention is not limited to the above configuration, and the recesses 130 provided to both wall faces 116B may be disposed at different positions to each other around the tire circumferential direction.

As illustrated in FIG. 6, the recesses 130 extend from further to the tire radial direction inside than the land portion height direction center of the center land portion 116 toward the tread face 116A side (the upper side in the drawing), and open onto the tread face 116A. Namely, a recess wall face 130E that is a side face on the tire radial direction inside of the recess 130 (recess wall face 130E of the recess 130 on the side of a groove bottom 114A of the circumferential direction groove 114) is disposed further to the tire radial direction inside than the land portion height direction center of the center land portion 116. Note that the openings of the recesses 130 at the wall faces 116B are referred to as wall face openings 130A, and the openings of the recesses 130 at the tread face 116A are referred to as tread face openings 130B. Note that the recesses 130 of the present exemplary embodiment are an example of second recesses of the present invention.

As illustrated in FIG. 6 and FIG. 7, a circumferential direction length A1 of the recess 130 of the present exemplary embodiment is uniform on progression from a recess bottom 130D toward the wall face opening 130A, and is uniform along the tire radial direction. An axial direction length B1 of the recess 130 is uniform along the tire circumferential direction and the tire radial direction, and a radial direction length C1 of the recess 130 is uniform along the tire circumferential direction and the tire axial direction. Namely, the wall face openings 130A of the recesses 130 of the present exemplary embodiment are substantially rectangular shaped when the wall faces 116B are viewed face-on.

Note that the present invention is not limited to the above configuration, and the wall face openings 130A of the recesses 130 may for example be triangular shaped, inverted triangular shaped, trapezoid shaped, inverted trapezoid shaped, or flask shaped when the wall faces 116B are viewed face-on, as illustrated in FIG. 7. Namely, the circumferential direction length A1, the axial direction length B1, and the radial direction length C1 of the recesses 130 may be modified.

The circumferential direction length A1 is a spacing (length) in the tire circumferential direction between both recess wall faces 130C of the recess 130 in the tire circumferential direction. The axial direction length B1 is a length along the tire axial direction from the wall face opening 130A of the recess 130 to the recess bottom (deepest portion of the recess 130) 130D. The radial direction length C1 is a length along the tire radial direction from the tread face opening 130B of the recess 130 to the recess wall face 130E. The axial direction length B1 of the recess 130 is preferably set to ¼ the width W3 of the center land portion 116 or less.

Both wall faces 120B of the respective intermediate land portions 120 are provided with plural recesses 132 around the tire circumferential direction. Specifically, the plural recesses 132 are provided to both wall faces 120B at spacings around the tire circumferential direction. Note that in the present exemplary embodiment, as illustrated in FIG. 5, the recesses 132 are provided to the wall faces 120B at uniform spacings P4 around the tire circumferential direction. The recesses 132 provided to both respective wall faces 120B are disposed at the same positions as each other around the tire circumferential direction. In other words, in the present exemplary embodiment, the recesses 132 provided to both wall faces 120B are aligned in rows along the tire axial direction. Note that the present invention is not limited to the above configuration, and the recesses 132 provided to both wall faces 120B may be respectively disposed at different positions to each other around the tire circumferential direction.

The recesses 132 extend from further to the tire radial direction inside than the land portion height direction center of the intermediate land portions 120 (the lower side in FIG. 6) toward the tread face 120A side (the upper side in FIG. 6), and open onto the tread face 120A. Namely, a recess wall face 132E that is a side face on the tire radial direction inside of the recess 132 is disposed further to the tire radial direction inside than the land portion height direction center of the intermediate land portions 120. Note that in the following, the openings of the recesses 132 at the wall faces 120B are referred to as wall face openings 132A, and the openings of the recesses 132 at the tread face 120A are referred to as tread face openings 132B. Note that the recesses 132 of the present exemplary embodiment are an example of first recesses of the present invention.

As illustrated in FIG. 6 and FIG. 7, a circumferential direction length A2 of the recess 132 of the present exemplary embodiment is uniform from a recess bottom 132D to the wall face opening 132A, and is uniform along the tire radial direction. An axial direction length B2 of the recess 132 is uniform along the tire circumferential direction and the tire radial direction, and a radial direction length C2 is uniform along the tire circumferential direction and the tire axial direction. Namely, the wall face openings 132A of the recesses 132 of the present exemplary embodiment are substantially rectangular shaped when the wall faces 120B are viewed face-on.

Note that the present invention is not limited to the above configuration, and the wall face openings 132A of the recesses 132 may, for example, be triangular shaped, inverted triangular shaped, trapezoid shaped, inverted trapezoid shaped, or flask shaped when the wall faces 120B are viewed face-on. Namely, the circumferential direction length A2, the axial direction length B2, and the radial direction length C2 of the recesses 132 may be modified.

The circumferential direction length A2 is a spacing (length) in the tire circumferential direction between both recess wall faces 132C of the recess 132 in the tire circumferential direction. The axial direction length B2 is a length along the tire axial direction from the wall face opening 132A of the recess 132 to the recess bottom (deepest portion of the recess 132) 132D. The radial direction length C2 is a length along the tire radial direction from the tread face opening 132B to the recess wall face 132E. The axial direction length B2 of the recess 132 is preferably set to ¼ the width W4 of the intermediate land portion 120 or less.

A wall face (side wall) 122B on the circumferential direction groove 118 side of each shoulder land portion 122 is provided with plural recesses 134 around the tire circumferential direction. Specifically, the plural recesses 134 are provided to the wall faces 122B at spacings around the tire circumferential direction. Note that in the present exemplary embodiment, as illustrated in FIG. 5, the recesses 134 are provided to the wall faces 122B at a uniform spacing P5 around the tire circumferential direction.

The recesses 134 extend from further to the tire radial direction inside than the land portion height direction center of the shoulder land portions 122 (the lower side in FIG. 6) toward the tread face 122A side (the upper side in FIG. 6), and open onto the tread face 122A. Namely, a recess wall face 134E that is a side face on the tire radial direction inside of the recess 134 (in other words, recess wall face 134E of the recess 134 on a groove bottom 118A side of the circumferential direction groove 118) is disposed further to the tire radial direction inside than the land portion height direction center of the shoulder land portions 122. Note that in the following, the openings of the recesses 134 at the wall faces 122B are referred to as wall face openings 134A, and the openings of the recesses 134 at the tread face 122A are referred to as tread face openings 134B.

As illustrated in FIG. 6 and FIG. 7, a circumferential direction length A3 of the recess 134 of the present exemplary embodiment is uniform from a recess bottom 134D to the wall face opening 134A, and is uniform along the tire radial direction. An axial direction length B3 of the recess 134 is uniform along the tire circumferential direction and the tire radial direction, and a radial direction length C3 is uniform along the tire circumferential direction and the tire axial direction. Namely, the wall face openings 134A of the recesses 134 of the present exemplary embodiment are substantially rectangular shaped when the wall faces 122B are viewed face-on. Note that the present invention is not limited to the above configuration, and the wall face openings 134A of the recesses 134 may, for example, be triangular shaped, inverted triangular shaped, trapezoid shaped, inverted trapezoid shaped, or flask shaped when the wall faces 122B are viewed face-on. Namely, the circumferential direction length A3, the axial direction length B3, and the radial direction length C3 of the recesses 134 may be modified.

The circumferential direction length A3 is a spacing (length) in the tire circumferential direction between both recess wall faces 134C of the recess 134 in the tire circumferential direction. The axial direction length B3 is a length along the tire axial direction from the wall face opening 134A of the recess 134 to the recess bottom (deepest portion of the recess 134) 134D. The radial direction length C3 is a length along the tire radial direction from the tread face opening 134B to the recess wall face 134E. The axial direction length B3 of the recess 134 is preferably set to ¼ the width W5 of the shoulder land portion 122 or less.

In the present exemplary embodiment, the respective circumferential direction lengths A1, A2, A3 of the recesses 130, the recesses 132, and the recesses 134 are set at the same lengths as each other. However, the present invention is not limited thereto, and, for example, each of the circumferential direction lengths A1, A2, A3 may be set at different respective lengths. The respective axial direction lengths B1, B2, B3 may be set at different lengths to each other, or may be set at the same length as each other, and the respective radial direction lengths C1, C2, C3 may be set at different lengths to each other, or may be set at the same length as each other.

As illustrated in FIG. 5, the number of the recesses 130 provided to each wall face 116B of the center land portion 116 is greater than the number of the recesses 132 provided to each wall face 120B of the intermediate land portions 120 that are adjacent to the center land portion 116. In the present exemplary embodiment, since the respective circumferential direction lengths of the recesses 130, 132 are the same length as each other, the spacing P3 of the recesses 130 is narrower than the spacing P4 of the recesses 132.

The number of the recesses 132 provided to each wall face 120B of the intermediate land portions 120 is greater than the number of the recesses 134 provided to each wall face 122B of the shoulder land portions 122. In the present exemplary embodiment, since the respective circumferential direction lengths of the recesses 132, 134 are the same length as each other, the spacing P4 of the recesses 132 is narrower than the spacing P5 of the recesses 134.

As illustrated in FIG. 6, the recesses 130 and the recesses 132 on the circumferential direction groove 114 side are disposed at a spacing (preferably a spacing of 1 mm or greater) in the tire radial direction from the groove bottoms 114A of the circumferential direction grooves 114. The side recesses 132 on the circumferential direction groove 118 and the recesses 134 are disposed at a spacing (preferably a spacing of 1 mm or greater) in the tire radial direction from the groove bottoms 118A of the circumferential direction grooves 118.

The wall faces 116B of the center land portion 116 are provided such that at least one of the recesses 130 is present in a ground contact region of the tread section 112. Twelve or more of the recesses 130 are preferably disposed around the circumference of the tire 110, and more preferably at a spacing of 2 to 3 cm around the tire circumferential direction. Note that the ground contact region of the tread section 112 refers to a ground contact region when the maximum load is applied in a state in which the tire 110 is inflated to an internal pressure of the air pressure corresponding to the maximum load on a single wheel of the applicable size under TRA standards or ERTRO standards.

As illustrated in FIG. 5, the recess bottoms 130D of the recesses 130 provided to the center land portion 116, and the recess bottoms 132D of the recesses 132 provided to the intermediate land portions 120 adjacent to the center land portion 116 are at different positions to each other around the tire circumferential direction. Namely, the recess bottoms 130D of the recesses 130 and the recess bottoms 132D of the recesses 132 are not aligned in rows in the tire axial direction, and are disposed at different positions around the tire circumferential direction (positions displaced around the tire circumferential direction).

Note that the present invention is not limited to the above configuration, and the recess bottoms 130D of the recesses 130 and the recess bottoms 132D of the recesses 132 may be disposed at the same positions as each other around the tire circumferential direction. The recess bottoms 130D of the recesses 130 and the recess bottoms 134D of the recesses 134 are also at different positions to each other around the tire circumferential direction. Note that the present invention is not limited to the above configuration, and the recess bottoms 130D of the recesses 130 and the recess bottoms 134D of the recesses 134 may be disposed at the same positions as each other around the tire circumferential direction. Moreover, the recess bottoms 132D of the recesses 132 and the recess bottoms 134D of the recesses 134 are also at different positions to each other around the tire circumferential direction. Note that the present invention is not limited to the above configuration, and the recess bottoms 132D of the recesses 132 and the recess bottoms 134D of the recesses 134 may be disposed at the same positions as each other around the tire circumferential direction. In the tire 110 of the present exemplary embodiment, the pattern of the tread section including the recesses 130, the recesses 132, and the recesses 134 has left-right symmetry around the tire equatorial plane CL.

Next, explanation follows regarding operation and advantageous effects of the tire 110 of the present exemplary embodiment. In the tire 110, plural of the recesses 130 are provided to both wall faces 116B of the center land portion 116, plural of the recesses 132 are provided to both wall faces 120B of the respective intermediate land portions 120, and plural of the recesses 134 are provided to the wall faces 122B of the respective shoulder land portions 122. This thereby enables an increase in the heat dissipating surface area of the center land portion 116, the intermediate land portions 120, and the shoulder land portions 122.

The recesses 130, 132, and 134 reduce the volume of rubber in the center land portion 116, the intermediate land portions 120, and the shoulder land portions 122 respectively, thereby reducing the amount of heat generated in the center land portion 116, the intermediate land portions 120, and the shoulder land portions 122 respectively. Excessive temperature increase (overheating) of the tread section 112 is accordingly suppressed. Namely, an increase in the temperature of the tread section 112 can be reliably suppressed even when, for example, the tire 110 rotates at high speed under heavy load when the aircraft takes off.

Moreover, since the width W3 of the center land portion 116 is wider than the width W4 of the intermediate land portions 120 and the width W5 of the shoulder land portions 122, the center land portion 116 has higher bending rigidity in the tire circumferential direction, and a higher volume of rubber. Accordingly, it tends to be more liable to increase in temperature than the other land portions (the intermediate land portions 120 and the shoulder land portions 122). However, the wall faces 116B of the center land portion 116 are provided with more of the recesses 130 than the recesses 132 provided to the wall faces 120B of the intermediate land portions 120 and the recesses 134 provided to the wall faces 122B of the shoulder land portions 122, thereby enabling increase in temperature of the center land portion 116 to be effectively suppressed.

In the tire 110, the recesses 130 of the center land portion 116 and the recesses 132 on the circumferential direction groove 114 side of the intermediate land portions 120 increase the groove volume of the circumferential direction grooves 114. The recesses 130, 132 increase the water discharge capacity of the circumferential direction grooves 114, improving water discharge performance. The recesses 132 on the circumferential direction groove 118 side of the intermediate land portions 120 and the recesses 134 of the shoulder land portions 122 increase the groove volume of the circumferential direction grooves 118. The recesses 132, 134 increase the water discharge capacity of the circumferential direction grooves 118, improving water discharge performance.

Moreover, in the tire 110, the recesses 130 are provided to both wall faces 116B of the center land portion 116, and the recesses 130 enable distortion of the rubber of the tread section configuring the center land portion 116 to be absorbed when the tread section 112 is in contact with the ground. This accordingly enables heat generation in the center land portion 116 to be suppressed. In particular, the recesses 130 open onto the tread face 116A of the center land portion 116, thereby enabling shear distortion occurring within the ground contact plane of the tread section 112 to be absorbed. This thereby enables distortion occurring in the vicinity of the tire axial direction edge portions of the tread face 116A of the center land portion 116 (corner portions of the center land portion 116) to be absorbed, suppressing heat generation.

Since an increase in ground contact pressure in the vicinity of the edge portions of the tread face 116A can be suppressed, it is possible to suppress uneven wear, such as river wear, in which the vicinity of the edge portions of the tread face 116A wears down faster than other portions (for example, a tire axial direction central portion) of the tread face 116A. The above operation and advantageous effect is also similarly obtained by the intermediate land portions 120 provided with the recesses 132 and the shoulder land portions 122 provided with the recesses 134.

Moreover, in the tire 110 the recess wall faces 130E of the recesses 130 are disposed further to the tire radial direction inside than the land portion height direction center of the center land portion 116. The recess wall faces 132E of the recesses 132 are disposed further to the tire radial direction inside than the land portion height direction centers of the intermediate land portions 120. The recess wall faces 134E of the recesses 134 are disposed further to the tire radial direction inside than the land portion height direction centers of the shoulder land portions 122. Accordingly, temperature increase on the groove bottom 114A side of the circumferential direction grooves 114 and temperature increase on the groove bottom 118A side of the circumferential direction grooves 118 respectively can be effectively suppressed.

The recesses 130 extend from further to the tire radial direction inside than the land portion height direction center of the center land portion 116 (the groove bottom 114A side of the circumferential direction grooves 114) toward the tread face 116A side, and open onto the tread face 116A. This thereby enables a sufficient heat dissipating surface area to be secured for the center land portion 116. The above operation and advantageous effect is also similarly obtained by the intermediate land portions 120 provided with the recesses 132 and the shoulder land portions 122 provided with the recesses 134.

In the tire 110, the recess bottoms 130D of the recesses 130, the recess bottoms 132D of the recesses 132, and the recess bottoms 134D of the recesses 134 are respectively at different positions around the tire circumferential direction (are displaced in the tire circumferential direction). Accordingly, the respective locations where the center land portion 116, the intermediate land portions 120, and the shoulder land portions 122 have lower rigidity and deform more readily as a result of providing the respective recesses 130, 132, and 134 are dispersed around the tire circumferential direction. The rigidity of the tread section 112 that is configured including the center land portion 116, the intermediate land portions 120, and the shoulder land portions 122 can accordingly be made to approach uniformity around the tire circumferential direction.

As illustrated in FIG. 7, the recesses 130 are configured extending in the tire radial direction from further to the tire radial direction inside than the land portion height direction center of the center land portion 116 toward the tread face 116A side, and open onto the tread face 116A; however the present invention is not limited thereto. For example, the recesses 130 may be configured to extend in a direction intersecting with the tire radial direction from further to the tire radial direction inside than the land portion height direction center of the center land portion 116 toward the tread face 116A, and open onto the tread face 116A. Similarly, the recesses 132, 134 may be configured extending along directions intersecting with the tire radial direction and opening onto the respective tread faces 120A, 122A, instead of extending along the tire radial direction and opening onto the respective tread faces 120A, 122A.

Fourth Exemplary Embodiment

Figure 8:
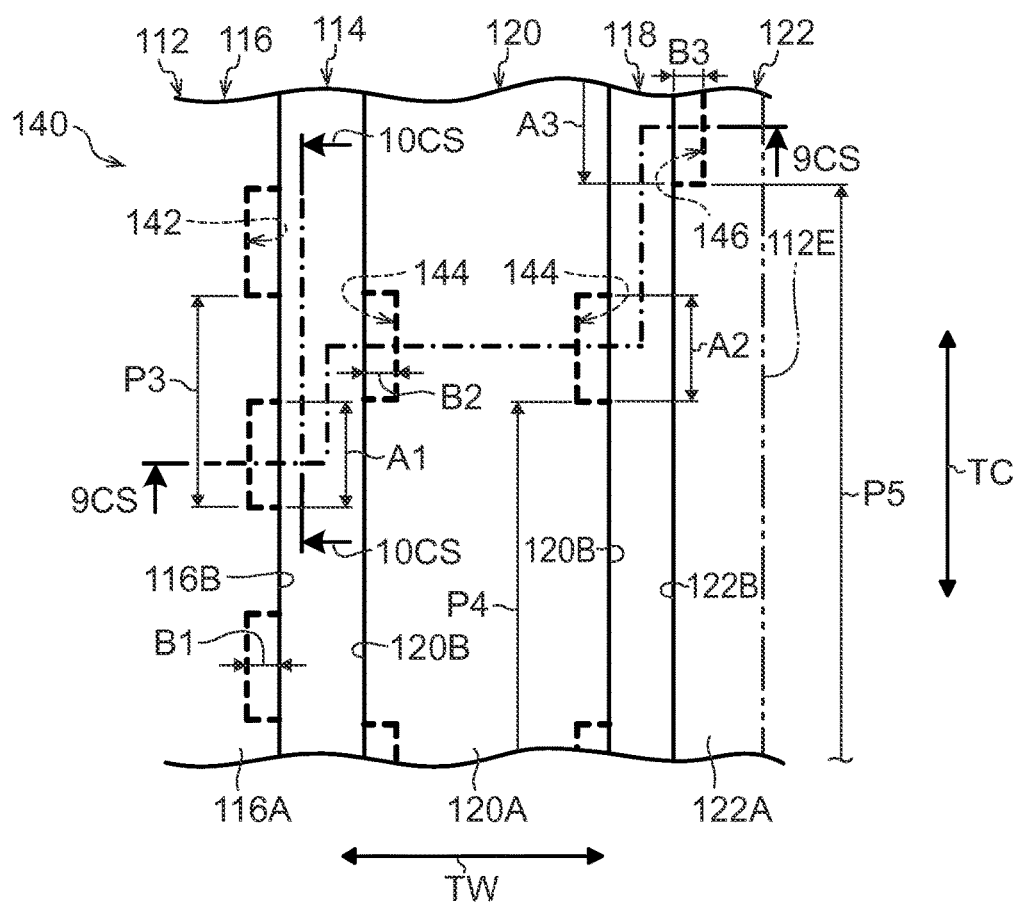
FIG. 8 is an opened-out view illustrating a tread pattern of an aircraft tire according to a fourth exemplary embodiment.
Figure 9:
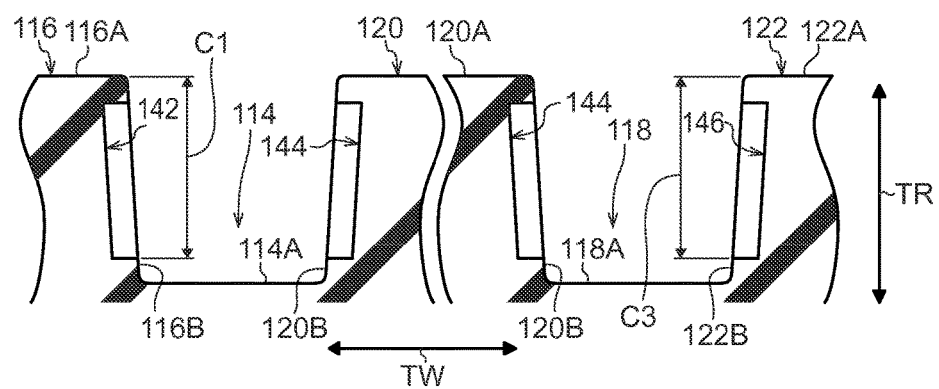
FIG. 9 is a cross-section taken along line 9CS-9CS in FIG. 8.
Figure 10:
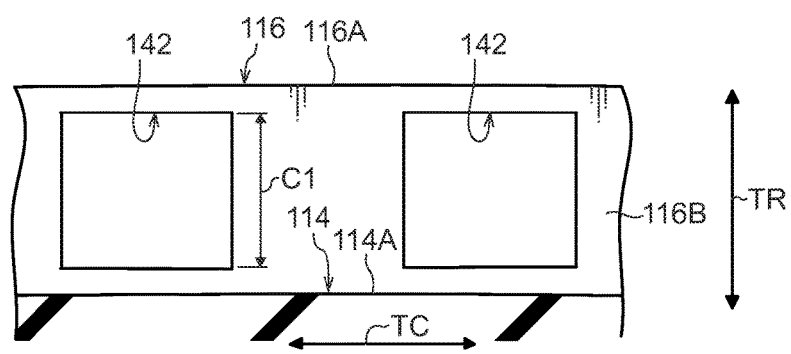
FIG. 10 is a cross-section taken along line 10CS-10CS in FIG. 8.

Next, explanation follows regarding an aircraft tire of a fourth exemplary embodiment of the present invention. Note that configurations similar to those of the third exemplary embodiment are allocated the same reference numerals, and explanation thereof is omitted. As illustrated in FIG. 8 to FIG. 10, in a tire 140 of the present exemplary embodiment, the wall faces 116B of the center land portion 116 are provided with recesses 142, serving as second recesses, in place of the recesses 130 of the third exemplary embodiment. The wall faces 120B of the intermediate land portions 120 are provided with recesses 144, serving as first recesses, in place of the recesses 132 of the third exemplary embodiment. The wall faces 122B of the shoulder land portions 122 are provided with recesses 146 in place of the recesses 134 of the third exemplary embodiment.

The recesses 142, 144, 146 of the present exemplary embodiment do not open onto the tread faces 116A, 120A, 122A of the respective land portions to which they are provided, as in the recesses 130, 132, 134 of the third exemplary embodiment. In other words, the recesses 142, 144, 146 are provided at a spacing toward the tire radial direction inside from the tread faces 116A, 120A, 122A of the respective land portions to which they are provided.

Next, explanation follows regarding operation and advantageous effects of the tire 140 of the present exemplary embodiment. Note that explanation regarding operation and advantageous effects similar to the operation and advantageous effects of the third exemplary embodiment is omitted. When the tire 140 is new, the recesses 142, the recesses 144, and the recesses 146 do not open onto the tread faces 116A, 120A, 122A of the respective land portions to which they are provided, thereby enabling the occurrence of wear originating at the openings onto the tread faces to be suppressed.

As wear of the tread section 112 advances, the recesses 142, 144, and 146 respectively open onto the tread faces 116A, 120A, and 122A. Accordingly, uneven wear and heat generation in the vicinity of the tread faces 116A, 120A, 122A can be effectively suppressed similarly to with the recesses 130, the recesses 132, and the recesses 134 of the third exemplary embodiment.

The configuration of providing the recesses 142, 144, 146 at a spacing toward the tire radial direction inside from the tread faces 116A, 120A, 122A of the land portions to which they are provided may be applied to the fifth exemplary embodiment, the sixth exemplary embodiment, and the seventh exemplary embodiment, described later.

Fifth Exemplary Embodiment

Figure 11:
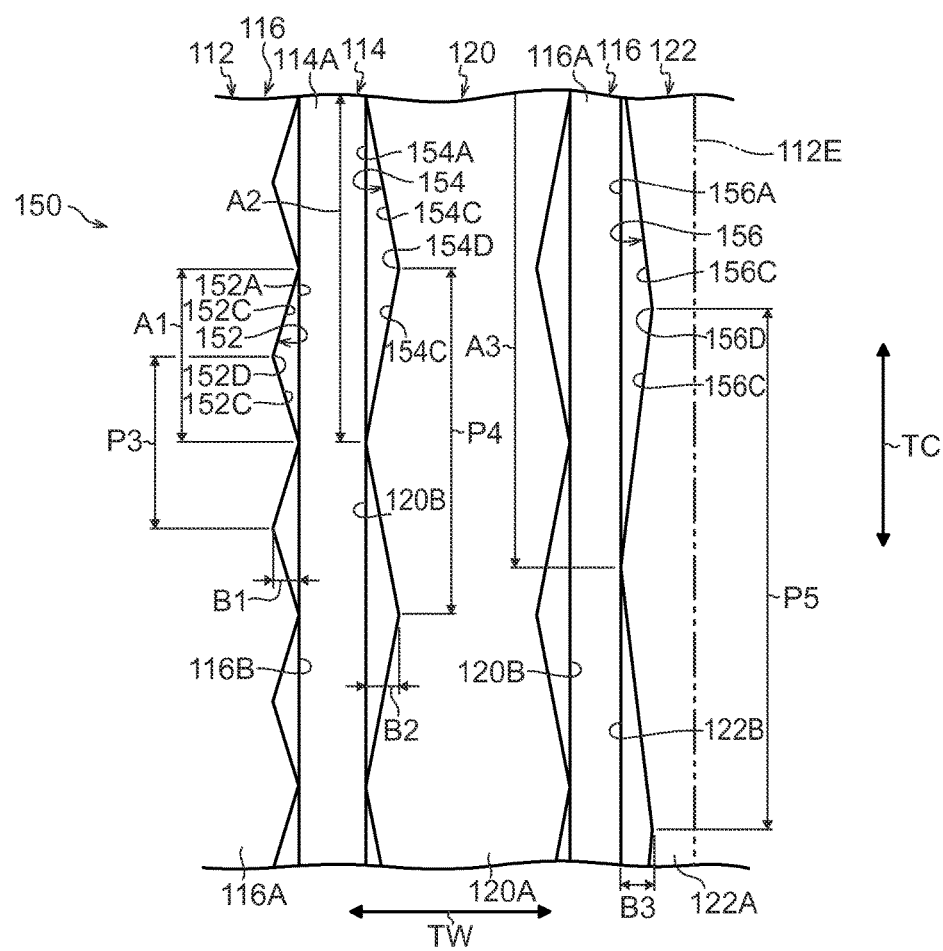
FIG. 11 is an opened-out view of a tread, illustrating a tread pattern of an aircraft tire according to a fifth exemplary embodiment.

Next, explanation follows regarding an aircraft tire of a fifth exemplary embodiment of the present invention. Note that configurations similar to those of the third exemplary embodiment are allocated the same reference numerals, and explanation thereof is omitted. As illustrated in FIG. 11, the center land portion 116 of a tire 150 of the present exemplary embodiment is provided with recesses 152 in place of the recesses 130 of the third exemplary embodiment. The intermediate land portions 120 are provided with recesses 154 in place of the recesses 132 of the third exemplary embodiment. The shoulder land portions 122 are provided with recesses 156 in place of the recesses 134 of the third exemplary embodiment. Other configurations are similar to those of the tire 110 of the third exemplary embodiment.

The recesses 152 extend from further to the tire radial direction inside than the land portion height direction center of the center land portion 116 toward the tread face 116A side, and open onto the tread face 116A. A circumferential direction length A1 of the recesses 152 gradually increases in length on progression from a recess bottom (deepest portion) 152D toward a wall face opening 152A. When the tread section is opened out and viewed from above, the extension direction length of both recess wall faces 152C of each of the recesses 152 in the circumferential direction is the same length.

The plural recesses 152 are joined together around the tire circumferential direction. Specifically, edges of the wall face openings 152A of recesses 152 adjacent in the tire circumferential direction coincide with each other. The recess wall faces 152C of the recesses 152 adjacent to each other in the tire circumferential direction thereby configure the wall faces 116B of the center land portion 116 in a zigzag pattern over the range in which the recesses 152 are provided.

The recesses 154 extend from further to the tire radial direction inside than the land portion height direction centers of the intermediate land portions 120 toward the tread face 120A side, and open onto the tread faces 120A. A circumferential direction length A2 of the recesses 154 gradually increases on progression from a recess bottom (deepest portion) 154D toward a wall face opening 154A. As illustrated in FIG. 11, when the tread section is opened out and viewed from above, the extension direction length of both respective wall faces 154C of each of the recesses 154 in the circumferential direction is the same length.

The plural recesses 154 are joined together around the tire circumferential direction. Specifically, edges of the wall face openings 154A of recesses 154 adjacent in the tire circumferential direction coincide with each other. The recess wall faces 154C of the recesses 154 adjacent to each other in the tire circumferential direction thereby configure the wall faces 120B of the intermediate land portions 120 in a zigzag pattern over the range in which the recesses 154 are provided.

The recesses 156 extend from further to the tire radial direction inside than the land portion height direction centers of the shoulder land portions 122 toward the tread face 122A side, and open onto the tread faces 122A. A circumferential direction length A3 of the recesses 156 gradually increases on progression from a recess bottom (deepest portion) 156D toward a wall face opening 156A. When the tread section is opened out and viewed from above, the extension direction length of both respective wall faces 156C of each of the recesses 156 in the circumferential direction is the same length.

The plural recesses 156 are joined together around the tire circumferential direction. Specifically, edges of the wall face openings 156A of recesses 156 adjacent in the tire circumferential direction coincide with each other. The recess wall faces 156C of the recesses 156 adjacent to each other in the tire circumferential direction thereby configure the wall faces 122B of the shoulder land portions 122 in a zigzag pattern over the range in which the recesses 156 are provided.

The number of the recesses 152 provided to each wall face 116B of the center land portion 116 is greater than the number of the recesses 154 provided to each wall face 120B of the intermediate land portions 120 that are adjacent to the center land portion 116. The spacing P3 of the recesses 152 and the circumferential direction length A1 of the wall face openings 152A are shorter than the spacing P4 of the recesses 154 and the circumferential direction length A2 of the wall face openings 154A.

The number of the recesses 154 provided to each wall face 120B of the intermediate land portions 120 is greater than the number of the recesses 156 provided to each wall face 122B of the shoulder land portions 122 that are adjacent to the intermediate land portions 120. The spacing P4 of the recesses 154 and the circumferential direction length A2 of the wall face openings 154A are shorter than the spacing P5 of the recesses 156 and the circumferential direction length A3 of the wall face openings 156A.

In the present exemplary embodiment, the recess bottoms 152D of the recesses 152 provided to both wall faces 116B of the center land portion 116 are disposed at the same respective positions as each other around the tire circumferential direction. The recess bottoms 154D of the recesses 154 provided to both wall faces 120B of the respective intermediate land portions 120 are disposed at the same respective positions as each other around the tire circumferential direction. Moreover, the recess bottoms 152D of the recesses 152, the recess bottoms 154D of the recesses 154, and the recess bottoms 156D of the recesses 156 are disposed at different respective positions to each other around the tire circumferential direction.

The present invention is not limited to the above configuration, and the recess bottoms 152D of the recesses 152 provided to both wall faces 116B of the center land portion 116 may be disposed at the same respective positions as each other around the tire circumferential direction. The recess bottoms 154D of the recesses 154 provided to both wall faces 120B of the respective intermediate land portions 120 may be disposed at the same respective positions as each other around the tire circumferential direction.

Moreover, the recess bottoms 152D of the recesses 152, the recess bottoms 154D of the recesses 154, and the recess bottoms 156D of the recesses 156 may be disposed at the same respective positions as each other around the tire circumferential direction. Moreover, the recess bottoms 152D of the recesses 152 and the recess bottoms 156D of the recesses 156 alone may be disposed at the same respective positions as each other around the tire circumferential direction. Note that in the tire 150 of the present exemplary embodiment, the pattern of the tread section including the recesses 152, the recesses 154, and the recesses 156 has left-right symmetry about the tire equatorial plane CL.

Next, explanation follows regarding operation and advantageous effects of the tire 150 of the present exemplary embodiment. Note that explanation regarding operation and advantageous effects similar to the operation and advantageous effects of the third exemplary embodiment is omitted. In the tire 150, the circumferential direction length A1 of the recesses 152 provided to the center land portion 116 becomes gradually longer on progression from the recess bottom 152D toward the wall face opening 152A, thereby enabling dispelled water flowing inside the circumferential direction grooves to flow smoothly, without collecting in the recesses 152. Note that the above operation and advantageous effect is similarly obtained by the recesses 154 provided to the intermediate land portions 120, and the recesses 156 provided to the shoulder land portions 122. The water discharge performance of the tire 150 is accordingly improved.

A sufficient heat dissipating surface area can be secured by the center land portion 116 since the adjacent recesses 156 in the tire circumferential direction are connected to each other. The volume of rubber in the center land portion 116 is also suppressed. This thereby enables excessive increase in the temperature of the center land portion 116 to be suppressed. Note that the above operation and advantageous effect is similarly obtained by the recesses 154 provided to the intermediate land portions 120, and the recesses 156 provided to the shoulder land portions 122. An excessive increase in the temperature of the tread section 112 can be suppressed as a result.

Sixth Exemplary Embodiment

Figure 12:
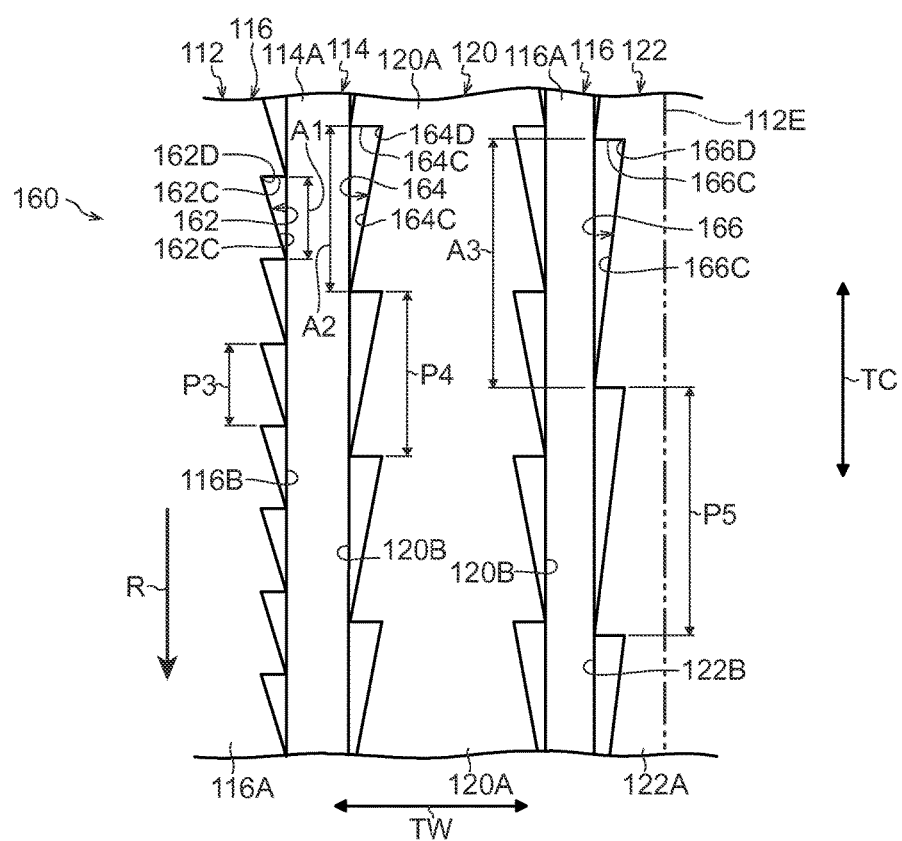
FIG. 12 is an opened-out view of a tread, illustrating a tread pattern of an aircraft tire according to a sixth exemplary embodiment.

Next, explanation follows regarding an aircraft tire of a sixth exemplary embodiment of the present invention. Note that configurations similar to those of the fifth exemplary embodiment are allocated the same reference numerals, and explanation thereof is omitted. As illustrated in FIG. 12, in a tire 160 of the present exemplary embodiment, the center land portion 116 is provided with recesses 162 of a different shape to the recesses 152 of the fifth exemplary embodiment. Moreover, the intermediate land portions 120 are provided with recesses 164 of a different shape to the recesses 154 of the fifth exemplary embodiment. The shoulder land portions 122 are provided with recesses 166 of a different shape to the recesses 156 of the fifth exemplary embodiment. Other configurations are similar to those of the tire 150 of the fifth exemplary embodiment.

When the tread section is opened out and viewed from above, both recess wall faces 162C of the respective recesses 162 have different extension direction lengths in the tire circumferential direction. Specifically, one recess wall face 162C of each of the recesses 162 extends along the tire axial direction, and the other recess wall face 162C is oblique with respect to the tire axial direction. The recess wall faces 162C of recesses 162 adjacent to each other around the tire circumferential direction thereby configure the wall faces 116B of the center land portion 116 with a saw-tooth shape over the range in which the recesses 162 are provided.

When the tread section is opened out and viewed from above, both recess wall faces 164C of the respective recesses 164 have different extension direction lengths in the tire circumferential direction. Specifically, one recess wall face 164C of each of the recesses 164 extends along the tire axial direction, and the other recess wall face 164C is oblique with respect to the tire axial direction. The recess wall faces 164C of recesses 164 adjacent to each other around the tire circumferential direction thereby configure the wall faces 120B of the intermediate land portions 120 with a saw-tooth shape over the range in which the recesses 164 are provided. When the tread section is opened out and viewed from above, both recess wall faces 166C of the respective recesses 166 have different extension direction lengths in the tire circumferential direction. Specifically, one recess wall face 166C of each of the recesses 166 extends along the tire axial direction, and the other recess wall face 166C is oblique with respect to the tire axial direction. The recess wall faces 166C of recesses 166 adjacent to each other around the tire circumferential direction thereby configure the wall faces 122B of the shoulder land portions 122 with a saw-tooth shape over the range in which the recesses 166 are provided. In FIG. 12, 162D, 164D, and 166D respectively indicate the recess bottoms of the recesses 162, 164, and 166. The arrow R in FIG. 12 is the preferred rotation direction of the tire 160.

The tire 160 enables an effective improvement in water discharge performance when mounted to an aircraft such that the rotation direction is the arrow R direction in FIG. 12. Specifically, when the tire 160 is mounted to an aircraft such that the rotation direction is the arrow R direction, the recesses 162, the recesses 164, and the recesses 166 repeatedly widen the groove volume of the circumferential direction grooves 114, 116 gradually on progression from the dig-in side to the kick-out side, thereby enabling dispelled water to flow smoothly in one direction (the opposite direction to the rotation direction R).

Note that the present invention is not limited to such a configuration, and the tread section 112 may be provided with other circumferential direction grooves extending around the tire circumferential direction. For example, as in a tread section 172 of a tire 170 of a seventh exemplary embodiment illustrated in FIG. 13, circumferential direction grooves 174 may be provided running around the tire circumferential direction at the tire axial direction outside of the circumferential direction grooves 118. The tread section 172 is formed with intermediate land portions 176 continuously around the tire circumferential direction between the circumferential direction grooves 174 and the circumferential direction grooves 118, and is formed with shoulder portions 178 adjacent to the intermediate land portions 176 at the tire axial direction outside of the circumferential direction grooves 174. The width of the intermediate land portions 176 is narrower than the width W4 of the intermediate land portions 120, and the width of the shoulder portions 178 is narrower than the width of the intermediate land portions 176.

Figure 13:
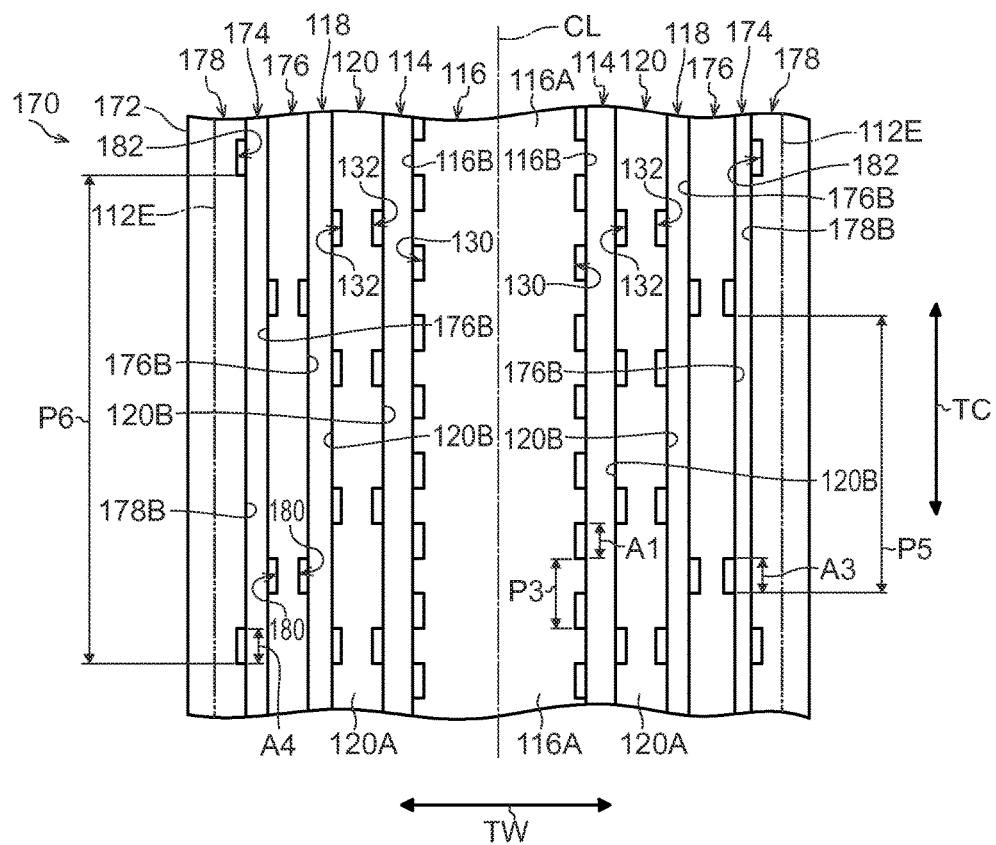
FIG. 13 is an opened-out view of a tread, illustrating a tread pattern of an aircraft tire according to a seventh exemplary embodiment.

The width of the intermediate land portions 176 illustrated in FIG. 13 is a tire axial direction length measured using similar methodology to that for the intermediate land portions 120, and the width of the shoulder portions 178 is a length measured using similar methodology to that for the shoulder land portions 122. Moreover, both wall faces (side walls) 176B of the intermediate land portions 176 are respectively provided with plural recesses 180 at a spacing P5 around the tire circumferential direction, and the wall faces 178B of the shoulder portions 178 are provided with plural recesses 182 at a spacing P4 around the tire circumferential direction. Note that in the present exemplary embodiment, the respective circumferential direction lengths A1, A3, and A4 of the recesses 130, the recesses 180, and the recesses 182 are each set at the same length. Moreover, the number of the recesses 180 provided to the wall faces 176B is lower than the number of the recesses 132 provided to the wall faces 120B, and the number of the recesses 182 provided to the wall faces 178B is lower than the number of the recesses 180 provided to the wall faces 176B.

In the third exemplary embodiment, the spacing P3 of the recesses 130 provided to the center land portion 116 is uniform; however the present invention is not limited thereto, and the spacing of the recesses 130 provided to the center land portion 116 does not have to be uniform. Similarly, the spacing P4 of the recesses 132 provided to the intermediate land portions 120 does not have to be uniform, and the spacing P5 of the recesses 134 provided to the shoulder land portions 122 does not have to be uniform. In such cases, repeated excessive deformation of the tread section 112 at the same cycle when the tire is rotating is suppressed, thereby enabling improved durability of the tire 110. The above configuration may also be applied to the other exemplary embodiments.

Explanation has been given above regarding the first to the seventh exemplary embodiments of the present invention; however the present invention is not limited to such exemplary embodiments, and obviously, various configurations may be implemented within a range not departing from the spirit of the present invention. For example, some of the second notches 24 formed to the second land portion 18 in FIG. 1 may be notched obliquely with respect to the tire radial direction, and interspersed with second notches 24 that are parallel to the tire width direction.

The disclosures of Japanese Patent Application Nos. 2013-092584 and 2013-092887, filed on Apr. 25, 2013, are incorporated in their entirety by reference herein.

All cited documents, patent applications and technical standards mentioned in the present specification are incorporated by reference in the present specification to the same extent as if the individual cited document, patent application, or technical standard was specifically and individually indicated to be incorporated by reference.

The invention claimed is:

1. An aircraft tire comprising:
    a tread section;
    a first land portion that is formed at the tread section by providing a plurality of circumferential direction grooves extending around a tire circumferential direction at a spacing from each other in a tire width direction, and that includes a plurality of first recesses provided around the tire circumferential direction of a wall face of the first land portion; and
    a second land portion that is formed by the circumferential direction grooves provided at the tread section, that has a wider width than the first land portion, and that includes a plurality of second recesses that is greater in number than the first recesses, the second recesses being provided around the tire circumferential direction of a wall face of the second land portion,
    wherein wall face openings of the second recesses are substantially rectangular shaped when the wall face of the second land portion is viewed face-on, and a circumferential direction length of each of the second recesses is uniform on progression from a recess bottom, which is a deepest portion of the second recess in a tire width direction, toward a wall face opening,
    wherein recess bottom faces of the second recesses are parallel to the wall face of the second land portion, and
    wherein the second recesses do not open onto the tread face of the aircraft tire.

2. The aircraft tire of claim 1, wherein the second land portion includes a plurality of wall faces, and second recesses formed at one wall face of the second land portion and second recesses formed at another wall face of the second land portion are formed at different positions from each other around the tire circumferential direction.

3. The aircraft tire of claim 1, wherein:
    a side face of each of the first recesses, extending in the tire circumferential direction, is disposed further from a first tread face, in a tire radial direction, than a center of the first land portion in a radial direction of the first land portion; and
    a side face of each of the second recesses, extending in the tire circumferential direction, is disposed further from a second tread face, in the tire radial direction, than a center of the second land portion in a radial direction of the second land portion.

4. The aircraft tire of claim 1, wherein a recess bottom of each of the first recesses and a recess bottom of each of the second recesses are formed at different positions from each other around the tire circumferential direction.

* * * * *